(12) United States Patent
Cros et al.

(10) Patent No.: US 10,526,074 B2
(45) Date of Patent: Jan. 7, 2020

(54) METHOD AND DEVICE FOR CONTROLLING COUPLED FORWARD AND AFT DOORS OF AN AIRCRAFT LANDING GEAR BAY

(71) Applicant: Airbus Operations (S.A.S.), Toulouse (FR)

(72) Inventors: Christian Cros, Pibrac (FR); Jérôme Phalippou, Tournefeuille (FR); Christophe Mialhe, Giroussens (FR); Jacques Peres, Razengues (FR)

(73) Assignee: Airbus Operations (S.A.S.), Toulouse (FR)

( * ) Notice: Subject to any disclaimer, the term of this patent is extended or adjusted under 35 U.S.C. 154(b) by 498 days.

(21) Appl. No.: 15/374,652

(22) Filed: Dec. 9, 2016

(65) Prior Publication Data
US 2017/0166300 A1    Jun. 15, 2017

(30) Foreign Application Priority Data

Dec. 11, 2015   (FR) ...................................... 15 62194

(51) Int. Cl.
*B64C 25/16* (2006.01)
*B64C 25/20* (2006.01)
(52) U.S. Cl.
CPC .............. *B64C 25/16* (2013.01); *B64C 25/20* (2013.01)
(58) Field of Classification Search
CPC ......... B64C 25/20; B64C 25/16; B64C 25/10; B64C 25/34; B64C 2025/125; B64C 25/18; B64C 25/14; B64C 25/04; B64C 25/02

See application file for complete search history.

(56) References Cited

U.S. PATENT DOCUMENTS

| | | | | |
|---|---|---|---|---|
| 2,548,832 A | * | 4/1951 | Tydon | B64C 25/16 244/101 |
| 2,747,817 A | * | 5/1956 | Saulnier | B64C 25/50 244/102 R |
| 4,674,712 A | * | 6/1987 | Whitener | B64C 1/00 244/119 |

(Continued)

FOREIGN PATENT DOCUMENTS

| | | |
|---|---|---|
| EP | 2 644 499 A1 | 10/2013 |
| FR | 2 956 645 A1 | 8/2011 |
| FR | 2 957 052 A1 | 9/2011 |

OTHER PUBLICATIONS

French Search Report for Application No. 1562194 dated Jul. 28, 2016.

*Primary Examiner* — Assres H Woldemaryam
(74) *Attorney, Agent, or Firm* — Jenkins, Wilson, Taylor & Hunt, P.A.

(57) ABSTRACT

A system for the control of the door assemblies of a bay of a landing gear of an aircraft, that is retractile and is able to be deployed, the opening of the bay for the landing gear being able to be closed by a forward door assembly and an aft door assembly, comprises a coupling mechanism of the forward door assembly and the aft door assembly, that is configured such that the aft door assembly is not completely closed, but is ajar, as soon as the forward door assembly is opened during the deployment of the landing gear and the aft door assembly is completely closed at the complete closing of the forward door assembly when the landing gear is retracted.

9 Claims, 3 Drawing Sheets

(56) References Cited

U.S. PATENT DOCUMENTS

| | | | | |
|---|---|---|---|---|
| 7,651,053 B2* | 1/2010 | Fort | .......................... | B64C 7/00 |
| | | | | 244/102 R |
| 9,957,039 B2* | 5/2018 | Peltier | ..................... | B64C 25/16 |
| 10,112,701 B2* | 10/2018 | Filho | ...................... | B64C 25/10 |
| 2005/0230549 A1* | 10/2005 | White | .................... | B64C 25/16 |
| | | | | 244/129.4 |
| 2006/0060707 A1* | 3/2006 | Chow | ...................... | B64C 7/00 |
| | | | | 244/129.4 |
| 2009/0008501 A1* | 1/2009 | Chow | .................... | B64C 25/16 |
| | | | | 244/100 R |
| 2010/0006696 A1* | 1/2010 | Chow | .................... | B64C 25/16 |
| | | | | 244/1 N |
| 2015/0251750 A1* | 9/2015 | Cook | ..................... | B64C 25/16 |
| | | | | 244/1 N |

\* cited by examiner

METHOD AND DEVICE FOR CONTROLLING COUPLED FORWARD AND AFT DOORS OF AN AIRCRAFT LANDING GEAR BAY

CROSS-REFERENCE TO RELATED APPLICATION

This application claims priority to French Patent Application FR 15 62194 filed Dec. 11, 2015, the entire disclosure of which is incorporated by reference herein.

TECHNICAL FIELD

The present disclosure concerns a method and a system for controlling door assemblies of wheel wells for retractable and deployable landing gear of an aircraft.

There are already known aircraft including at least one landing gear wheel well the opening of which, through which the landing gear passes, can be closed by a forward door assembly and an aft door assembly.

BACKGROUND

When the landing gear is retracted inside the wheel well, that is to say when the aircraft is in flight, the forward and aft door assemblies are both closed and are in aerodynamic continuity with the portion of the fuselage of the aircraft surrounding the opening of the landing gear wheel well. To deploy the landing gear, the first step is to open the forward door assembly for the landing gear to pass through it, the aft door assembly remaining closed, after which, deployment continuing, the aft door assembly is opened and the front door assembly closed again. This process makes it possible to limit the introduction into the interior of the wheel well of an airflow that would generate turbulence and therefore drag.

Accordingly, when the landing gear is in its entirely deployed position, the forward door assembly is closed and the aft door assembly is open only to allow the leg of the landing gear to pass through it.

Conversely, when the landing gear has been deployed and must be retracted into the wheel well, the aft door assembly then being open, the first step is to open the forward door assembly, after which, when the landing gear leg, in retracting, has moved out of the aft door assembly, the latter is closed, after which, the landing gear having been completely retracted into the wheel well, the forward door assembly is also closed.

Accordingly, both on landing (deployment of the landing gear) and on take-off (retraction of the landing gear) of the aircraft, the process of controlling the landing gear includes a temporary phase during which the forward door assembly is open and the aft door assembly is closed. During such a temporary phase, air enters the wheel well via the forward door assembly and strikes the aft door assembly, which produces vibrations generating noise and drag, at the same time as subjecting the aft door assembly and its environment to high mechanical forces.

SUMMARY

An object of the present disclosure is to remedy these drawbacks.

To this end, according to the disclosure herein, a method for the control of the door assemblies of a wheel well for the landing gear of an aircraft that can be retracted and deployed, the opening of the wheel well for the landing gear to pass through being adapted to be closed by a forward door assembly and an aft door assembly and the method including at least one temporary phase during which the forward door assembly is open and the aft door assembly is closed, is noteworthy in that the aft door assembly and the forward door assembly are coupled so that that the aft door assembly:

is not completely closed, but is ajar, as soon as the forward door assembly is opened during the deployment of the landing gear, and is completely closed on the complete closing of the forward door assembly during the retraction of the landing gear.

Accordingly, thanks to the present disclosure, the flows of air entering the wheel well via the open forward door assembly can escape via the aft door assembly that is ajar, which attenuates the vibrations and therefore the noise, drag and mechanical forces that they generate.

The coupling between the aft door assembly and the front door assembly may be of any kind: electrical, hydraulic, pneumatic, etc. However, this coupling is preferably a mechanical coupling.

In the usual situation in which:

the forward door assembly includes a left forward door and a right forward door, the two forward doors rotating symmetrically about respective lateral axes, and the aft door assembly includes a left aft door and a right aft door, the two aft doors rotating symmetrically about respective lateral axes, according to the disclosure herein it is advantageous to couple the left aft door to the left forward door and the right aft door to the right forward door.

The coupling step advantageously comprises or consists of preventing the aft doors of the aft door assembly from being completely closed when the forward doors of the forward door assembly are not completely closed during retraction of the landing gear.

The present disclosure additionally concerns a system for the control of the door assemblies of a wheel well for the landing gear of an aircraft that can be retracted and deployed, the opening of the wheel well for the landing gear to pass through being adapted to be closed by a forward door assembly and an aft door assembly, this system being noteworthy in that it comprises a mechanism for coupling the forward door assembly and the aft door assembly that is configured so that the aft door assembly:

is not completely closed, but is ajar, as soon as the forward door assembly is opened during the deployment of the landing gear, and is completely closed on the complete closing of the forward door assembly during the retraction of the landing gear.

In the situation referred to above in which each door assembly includes two doors, the system may include:

for each of the two forward doors, at least one actuator articulated, on one side, to the landing gear wheel well and, on the other side, to the forward door concerned, the actuator causing the opening and the closing of the latter, and for each of the two aft doors, at least one connecting link articulated, on one side, to the landing gear and, on the other side, to the aft door concerned, the connecting link causing the opening and the closing of the latter in conjunction with the deployment and the reaction of the landing gear, and is noteworthy in that:

the connecting link is a spring link adapted to be elongated spontaneously;

the coupling mechanism includes two mechanical couplings respectively coupling the aft door with the forward door on the same side, each of the mechanical couplings including a torsion bar parallel to the rotation lateral axes and mounted to rotate about its longitudinal axis relative to the landing gear wheel well, the torsion bar inhibiting the spontaneous elongation of the spring link when the coupled forward and aft doors are closed and allowing this spontaneous elongation when the forward door is opened, thereby leading to the aft door being ajar.

Each of the mechanical couplings further includes abutments respectively fastened to the forward doors and the aft doors cooperating with transverse fingers fastened to the ends of the torsion bar.

In this case, the transverse fingers can be respectively in contact with the abutments when the coupled forward and rear doors are closed and escape from the abutments when the actuator opens the forward door.

The present disclosure also concerns an aircraft including at least one landing gear wheel well that can be closed by a forward door assembly and an aft door assembly noteworthy in that it includes a system such as that described above for the control of the door assemblies.

The present disclosure is particularly, although not exclusively, appropriate for application to an aircraft nose landing gear wheel well.

BRIEF DESCRIPTION OF THE DRAWINGS

The appended figures explain clearly how the disclosure herein may be reduced to practice. In these figures, identical references designate similar elements. More specifically.

DETAILED DESCRIPTION

Figure 1:
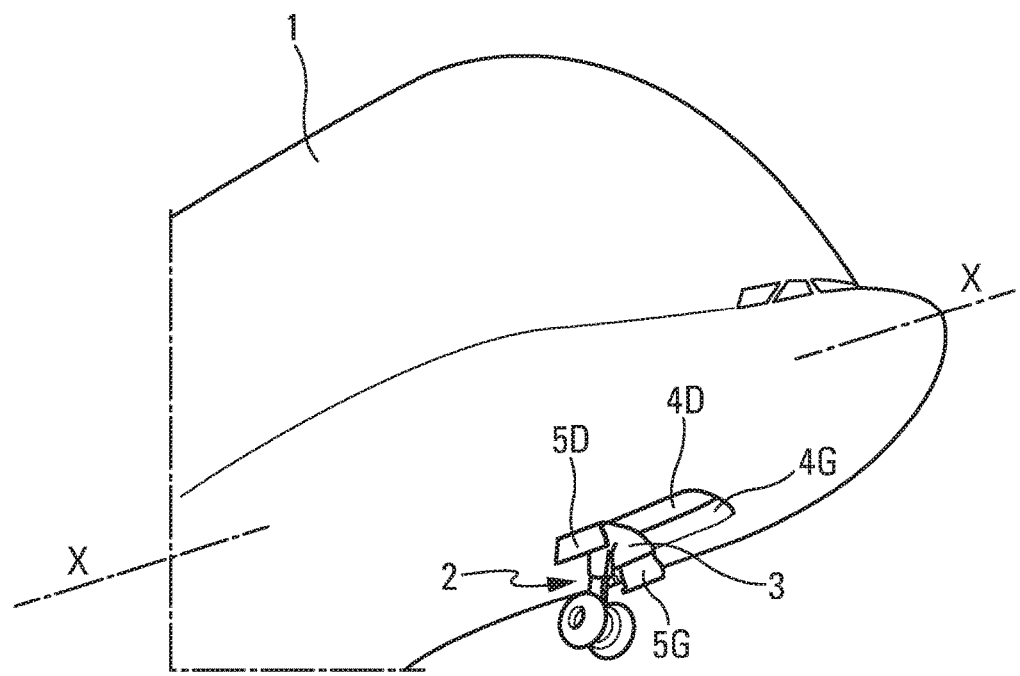
FIG. 1 a diagrammatic perspective view from below of an aircraft having a nose landing gear that can be retracted into a wheel well that can be closed by a forward door assembly and an aft door assembly.

In FIG. 1 there is diagrammatically represented the forward portion of an aircraft 1 with longitudinal axis X-X including a deployable nose undercarriage leg 2 that can be retracted into a wheel well 3. The opening of the wheel well for the undercarriage leg 2 to pass through can be closed by a forward door assembly comprising or consisting of a left forward door 4G and a right forward door 4D that are symmetrical to each other and by an aft door assembly comprising or consisting of a left aft door 5G and a right aft door 5D that are symmetrical to each other.

Figure 2:
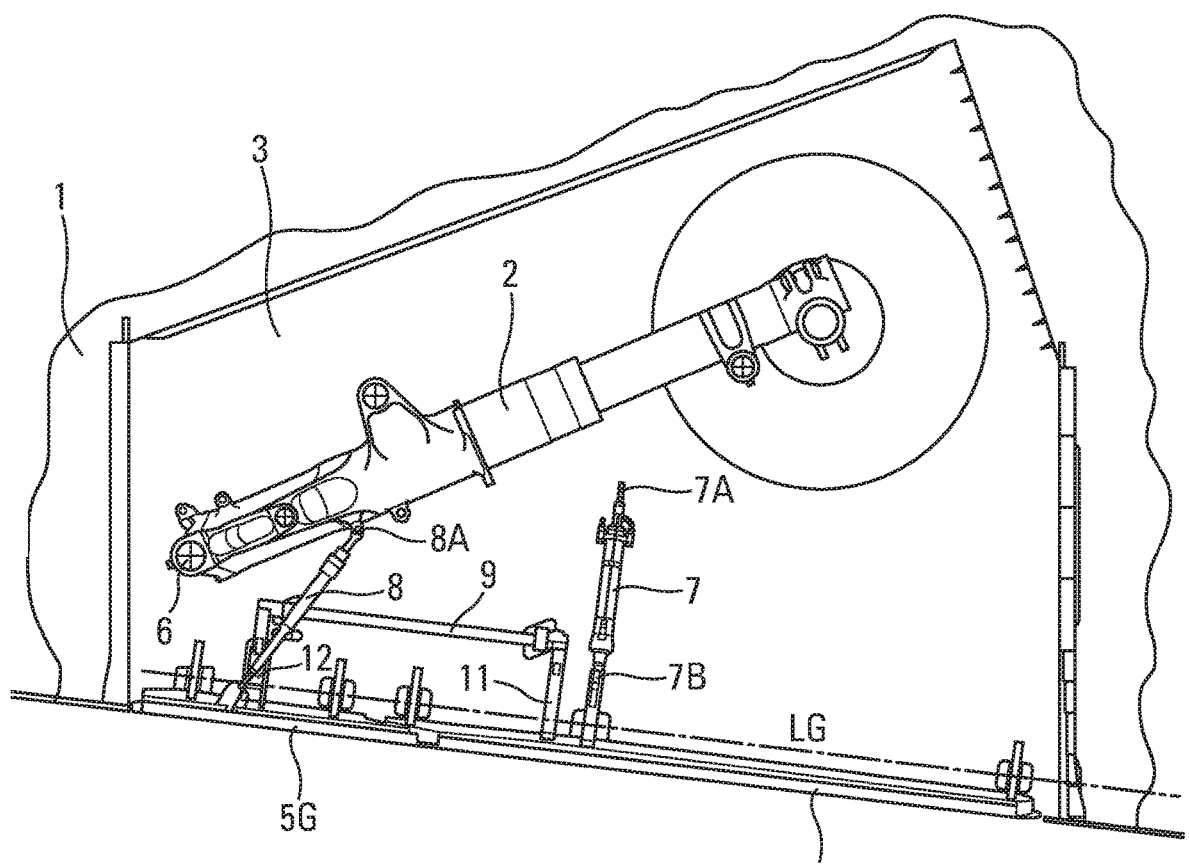
FIG. 2 is a diagrammatic longitudinal section of a portion of the wheel well of the aircraft from FIG. 1 improved in accordance with the present disclosure.
Figure 3:
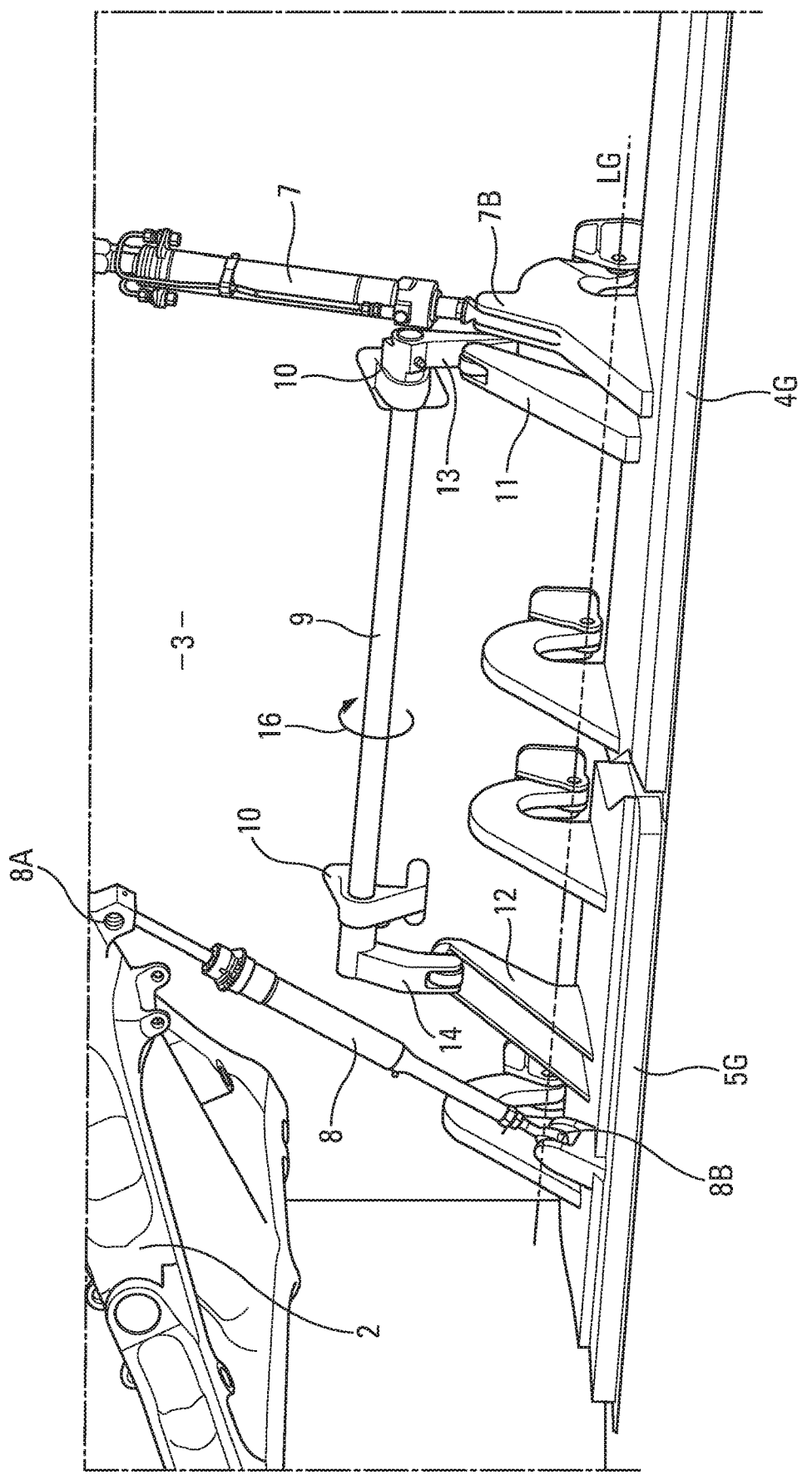
FIG. 3 is a perspective view to a larger scale of a longitudinal portion of the control system of the door assemblies of the wheel well shown in FIG. 2, the door assemblies being in their closed position.

As represented in FIGS. 2 and 3, the left doors 4G and 5G are mounted to rotate symmetrically about a lateral axis LG.

In exactly the same way, although this cannot be seen in the figures, the right doors 4D and 5D are mounted to rotate symmetrically about a lateral axis LD (not shown).

In FIG. 1 the undercarriage leg 2 is represented in the deployed position passing through the opening of the wheel well 3 formed by the aft doors 5G and 5D in their open position, the forward doors 4G and 4D being closed. In contrast, in FIGS. 2 and 3, the undercarriage leg 2 is retracted into the wheel well 3 and the forward and aft door assemblies are closed. In these figures, because of the representation in longitudinal section, only the doors 4G and 5G can be seen, the doors 4D and 5D being of course symmetrical to them relative to the median longitudinal plane of the aircraft 1.

To clarify the drawings, the system controlling the deployment and retraction of the undercarriage leg 2 by rotating about its axis 6 is not represented in FIGS. 2 and 3. On the other hand, those figures show means for opening and closing the doors 4G, 4D and 5G, 5D that include:

for each of the forward doors 4G and 4D, at least one actuator 7, articulated at the end 7A to the wheel well 3 and at the other end 7B to the forward door 4G or 4D concerned:

for each of the aft doors 5G and 5D, at least one spontaneously extended spring link 8 articulated at the end 8A to the undercarriage leg 2 and at the other end 8B to the aft door 5G or 5D concerned.

In the prior art, without the features of the disclosure herein described hereinafter, the forward and rear door assemblies are opened in the following manner.

The undercarriage leg 2 being initially retracted into the wheel well 3, as represented in FIGS. 2 and 3, the deployment thereof begins with the opening of the forward doors 4G and 4D by the associated actuators 7. The undercarriage leg 2 then pivoting in the clockwise direction, the associated spring links 8 press on the aft doors 5G and 5D, which open. When the undercarriage leg 2 is positioned between the open aft doors 5G and 5D, the actuators 7 close the forward doors 4G and 4D.

Conversely, the undercarriage leg 2 being initially deployed outside the wheel well 3 with the forward doors 4G and 4D closed, the retraction thereof begins with the opening of the forward doors 4G and 4D by the associated actuators 7. The undercarriage leg 2 then pivots in the counterclockwise direction. The associated spring links 8 pull on the aft doors 5G and 5D, which close. When the landing 2 has entered the wheel well 3, the actuators 7 close the forward doors 4G and 4D.

Accordingly, in the prior art, without the features of the disclosure herein described hereinafter, both when deploying and when retracting the undercarriage leg 2, there exists a phase during which the forward doors 4G and 4D are open while the aft doors 5G and 5D are closed, so that a flow of air under pressure is engulfed in the wheel well, generating aerodynamic, mechanical and acoustic problems.

According to the disclosure herein, to attenuate the aforementioned problems, couplings are provided between the forward door 4G and the aft door 5G and between the forward door 4D and the aft door 5D to allow the aft doors 5G and 5D to remain ajar when the forward doors 4G and 4D open during the deployment of the undercarriage leg 2 and to prevent the aft doors 5G and 5D from closing completely until the forward doors 4G and 4D are closed completely during the retraction of the landing gear 2.

To this end, in the embodiment represented in FIGS. 2 to 5, each of the couplings between the forward door 4G and the aft door 5G and between the forward door 4D and the aft door 5D is a mechanical coupling and comprises, on the one hand, a torsion bar 9 parallel to the rotation axes LG and LD and mounted to rotate about its longitudinal axis by means of fixed bearings 10 mounted in the wheel well 3 and, on the other hand, abutments 11 and 12 respectively fastened to the forward door 4G (or 4D) and the rear door 5G (or 5D) and cooperating with transverse fingers 13 and 14 fastened to the ends of the torsion bar. The torsion bar 9 includes one or more springs configured to turn the torsion bar in a direction 16 represented in FIG. 3.

When the forward doors 4G, 4D and the aft doors 5G, 5D are closed (see FIG. 2 and FIG. 3), the abutment 11 of each of the forward doors pushes on the corresponding transverse finger 13, possibly via a roller, and the transverse finger 14 pushes on the abutment 12 of each of the aft doors, preventing them from opening.

Figure 4:
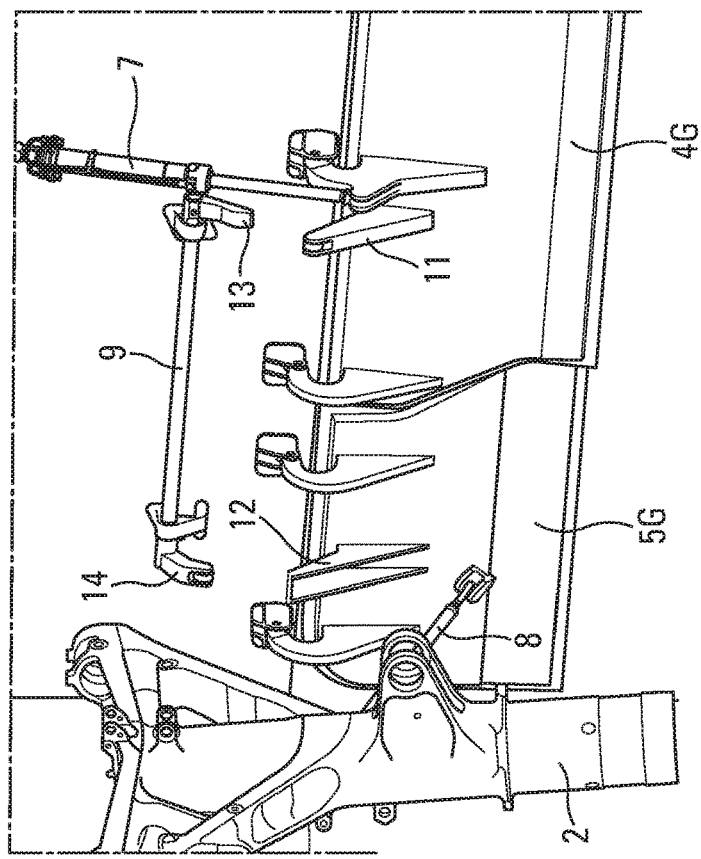
FIG. 4 is a perspective view of the aft door assembly of the wheel well from FIGS. 2 and 3 when it is ajar when the forward door assembly of the wheel well is at least partly open, both during opening and during closing of the forward door assembly.

On the other hand, when the actuator 7 is commanded to open the forward door 4G (or 4D), the transverse finger 13 escapes from the abutment 11 and the torsion bar 9 is turned in the direction 16 by its spring or springs and allows the transverse finger 14 to escape from the abutment 12 (see FIG. 4). The aft door 5G (or 5D) is therefore no longer locked by the torsion bar 9 and is able to remain slightly ajar because of the action of the spring link 8 that is extended because its spring is compressed until a mechanical stop is reached that defines its maximum length. Any other way of extending it to its maximum length is possible. FIG. 4 shows a gap 15 that is produced because the aft door 5G is ajar.

In this situation, air entering the wheel well 3 via the forward doors 4G, 4D is therefore able to escape freely through this gap 15, thus attenuating the harmful phenomena referred to above.

Figure 5:
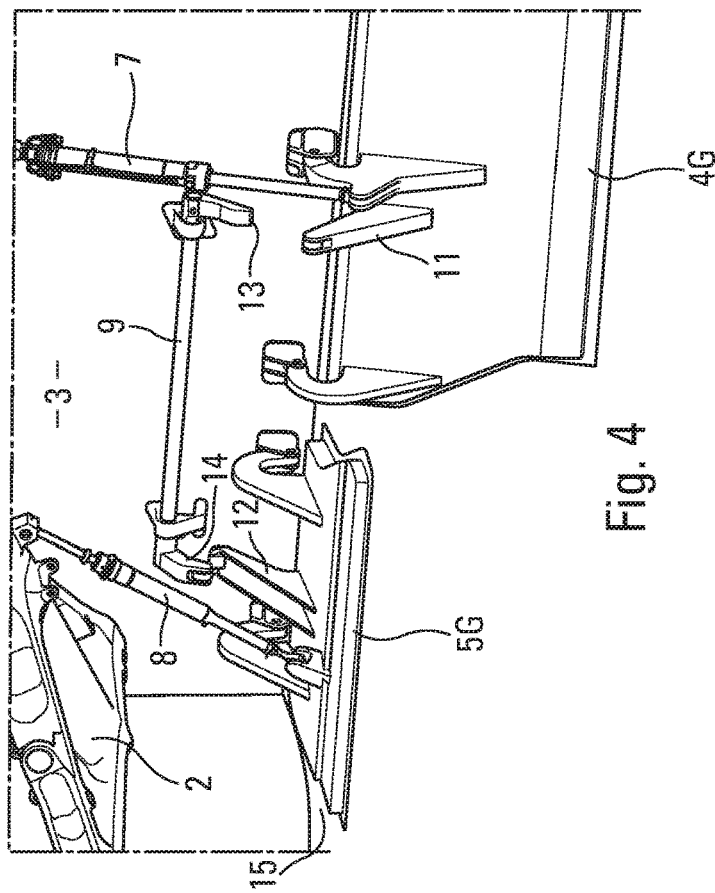
FIG. 5 is a perspective view of the forward door assembly and the aft door assembly of the wheel well from FIGS. 2 to 4 in their open position.

After the forward doors 4G (4D) are opened, the undercarriage leg 2 can be deployed, entailing the opening of the aft doors 5G (5D), as represented in FIG. 5.

The doors 4G, 4D are then closed completely, the undercarriage leg 2 still being deployed.

On retraction of the undercarriage leg 2 starting from the deployed position shown in FIG. 5 (the forward doors 4G, 4D having been opened again already), the aft door 5G (5D) is pulled on by the spring link 8 which, because it is extended, prevents the aft door 5G (5D) from closing completely to maintain the gap 15 (see FIG. 4). When the actuator 7 closes the forward door 4G (4D), the abutment 11 bears on the transverse finger 13, forcing the torsion bar 9 to turn in the direction opposite to the direction 16. The transverse finger 14 then bears on the abutment 12, forcing the aft door 5G (5D) to close completely and forcibly shortening the spring link 8.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for control of door assemblies of a wheel well for landing gear of an aircraft, wherein an opening of the wheel well for the landing gear to pass through is configured to be closed by a forward door assembly and an aft door assembly,
    the method comprising a coupling phase comprising coupling the forward door assembly and the aft door assembly with a coupling mechanism so that the aft door assembly:
    is not completely closed, but is ajar, as soon as the forward door assembly is opened during deployment of the landing gear; and
    is completely closed on complete closing of the forward door assembly during retraction of the landing gear,
    wherein the coupling mechanism prevents the aft doors of the aft door assembly from being completely closed when the forward doors of the forward door assembly are not completely closed during the retraction of the landing gear.

2. The method as claimed in claim 1, wherein the coupling mechanism comprises mechanically coupling the aft door assembly and the forward door assembly.

3. The method as claimed in claim 1, applied to a landing gear wheel well in which:
    the forward door assembly comprises a left forward door and a right forward door, the two forward doors rotating symmetrically about respective lateral axes; and
    the aft door assembly comprises a left aft door and a right aft door, the two aft doors rotating symmetrically about respective lateral axes,
    wherein the left aft door is coupled to the left forward door and the right aft door is coupled to the right forward door.

4. A system for control of door assemblies of a wheel well for landing gear of an aircraft, wherein an opening of the wheel well for the landing gear to pass through is configured to be closed by a forward door assembly and an aft door assembly, the system comprising:
    a left forward door and a right forward door of the forward door assembly, the two forward doors rotating symmetrically about respective lateral axes;
    a left aft door and a right aft door the aft door assembly, the two aft doors rotating symmetrically about respective lateral axes;
    for each of the two forward doors, at least one actuator articulated, on one side, to the landing gear wheel well and, on another side, to the respective forward door, the actuator causing opening and closing of the forward door assembly;
    for each of the two aft doors, at least one connecting link articulated, on one side, to the landing gear and, on another side, to the respective aft door, the connecting link causing opening and closing of the aft door assembly in conjunction with deployment and retraction of the landing gear; and
    a mechanism for coupling the forward door assembly and the aft door assembly that is configured so that the aft door assembly:
    is not completely closed, but is ajar, as soon as the forward door assembly is opened during deployment of the landing gear; and
    is completely closed on complete closing of the forward door assembly during retraction of the landing gear.

5. The system as claimed in claim 4,
    wherein:
    the connecting link is a spring link adapted to be elongated spontaneously;

the coupling mechanism comprises two mechanical couplings respectively coupling the aft door assembly with the forward door assembly on a same side, each of the mechanical couplings including a torsion bar parallel to rotation lateral axes and mounted to rotate about a longitudinal axis of the torsion bar relative to the landing gear wheel well, the torsion bar inhibiting spontaneous elongation of the spring link when the coupled forward and aft doors are closed and allowing the elongation when the forward door is opened, thereby leading to the aft door remaining ajar.

6. The system as claimed in claim 5, wherein each of the mechanical couplings further comprises abutments respectively fastened to the forward doors and the aft doors cooperating with transverse fingers fastened to ends of the torsion bar.

7. The system as claimed in claim 6, wherein the transverse fingers are respectively in contact with the abutments when the coupled forward doors and rear doors are closed and escape from the abutments when the actuator opens the forward door.

8. An aircraft including at least one landing gear wheel well that is configured to be closed by a forward door assembly and by an aft door assembly, wherein, for control of the door assemblies, the aircraft comprises a system as claimed in claim 4.

9. The aircraft as claimed in claim 8, wherein the landing gear wheel well is that of nose landing gear of the aircraft.

\* \* \* \* \*